US010248934B1

(12) United States Patent
Shen et al.

(10) Patent No.: US 10,248,934 B1
(45) Date of Patent: Apr. 2, 2019

(54) SYSTEMS AND METHODS FOR LOGGING AND REVIEWING A MEETING

(71) Applicant: Melo Inc., San Jose, CA (US)

(72) Inventors: Guobin Shen, Beijing (CN); Zheng Han, Beijing (CN)

(73) Assignee: MELO INC., San Jose, CA (US)

( * ) Notice: Subject to any disclaimer, the term of this patent is extended or adjusted under 35 U.S.C. 154(b) by 9 days.

(21) Appl. No.: 15/969,768

(22) Filed: May 2, 2018

Related U.S. Application Data

(60) Provisional application No. 62/587,170, filed on Nov. 16, 2017.

(51) Int. Cl.
*G06Q 10/10* (2012.01)
*G10L 15/26* (2006.01)
*G06F 16/683* (2019.01)
*G06F 16/2455* (2019.01)

(52) U.S. Cl.
CPC ... *G06Q 10/1091* (2013.01); *G06F 16/24568* (2019.01); *G06F 16/685* (2019.01); *G10L 15/26* (2013.01)

(58) Field of Classification Search
CPC ......... G06Q 10/00; G06Q 40/06; G06F 17/60
USPC ....................................................... 705/7.13
See application file for complete search history.

(56) References Cited

U.S. PATENT DOCUMENTS

| 5,911,776 | A | * | 6/1999 | Guck | ................ | G06F 17/30569 |
| | | | | | | 707/999.104 |
| 8,782,566 | B2 | * | 7/2014 | Sarkar | ................. | G06F 3/04883 |
| | | | | | | 715/728 |
| 9,646,198 | B2 | * | 5/2017 | Cunico | .................. | H04N 7/147 |
| 2012/0223819 | A1 | * | 9/2012 | Burgess | ............... | H04B 5/0031 |
| | | | | | | 340/10.42 |
| 2012/0230540 | A1 | * | 9/2012 | Calman | .............. | G06K 9/00221 |
| | | | | | | 382/103 |
| 2014/0282620 | A1 | * | 9/2014 | Nuovo | ................ | G06F 16/9535 |
| | | | | | | 719/318 |
| 2016/0042226 | A1 | * | 2/2016 | Cunico | .................. | H04N 7/147 |
| | | | | | | 382/103 |
| 2017/0214723 | A1 | * | 7/2017 | Sanso | .................... | H04L 65/403 |
| 2017/0344404 | A1 | * | 11/2017 | Liongosari | ............. | G06N 7/005 |

(Continued)

*Primary Examiner* — Romain Jeanty
(74) *Attorney, Agent, or Firm* — Bayes PLLC

(57) ABSTRACT

Embodiments of the disclosure provide a system and methods for logging and reviewing a meeting. The system may include a communication interface configured to receive video of the meeting captured by at least one camera device and audio of the meeting captured by at least one microphone device, a memory having computer-executable instructions stored thereon, and a processor. The processor may be configured to execute the instructions to generate a plurality of data streams based on captured video and captured audio, and to determine identifications of attendees of the meeting based on at least one of the captured video and the captured audio. The processor may also be configured to execute the instructions to transcribe speeches of the attendees based on at least one of the captured audio. The processor may be further configured to execute the instructions to match the identifications to the plurality of data streams, and to cause a data stream of the plurality of data streams to be shown on the display based on a user-selected identification of an attendee of the meeting.

17 Claims, 5 Drawing Sheets

(56) References Cited

U.S. PATENT DOCUMENTS

2018/0039634 A1* 2/2018 Goldstein ........... G06F 17/3053
2018/0174587 A1* 6/2018 Bermundo .............. G10L 15/26

* cited by examiner

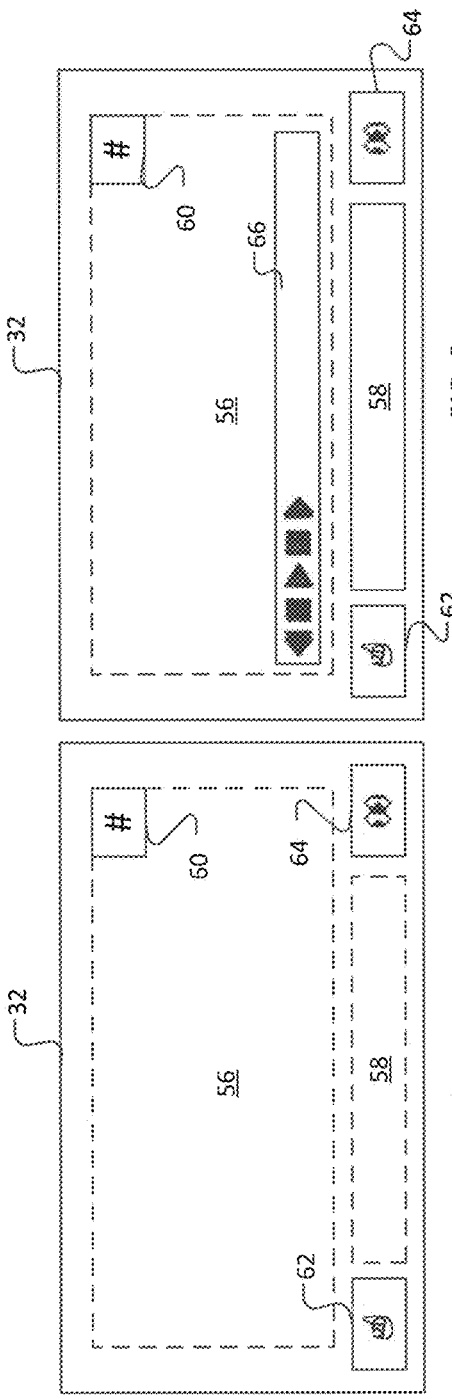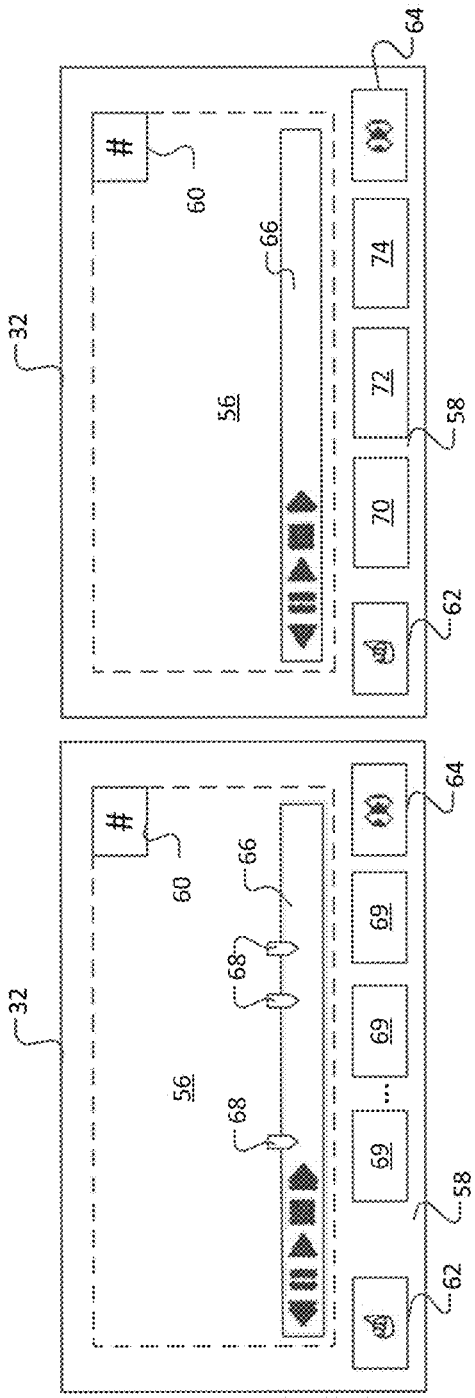

SYSTEMS AND METHODS FOR LOGGING AND REVIEWING A MEETING

CROSS REFERENCE TO RELATED APPLICATION

The present application is based on and claims the benefits of priority to U.S. Provisional Application No. 62/587,170, filed Nov. 16, 2017, which is incorporated herein by reference in its entirety.

TECHNICAL FIELD

The present disclosure relates to systems and methods for logging and reviewing a meeting, and more particularly to, systems and methods for logging a meeting using multiple streams to preserve meeting details and facilitate matching of meeting content and attendees.

BACKGROUND

Meetings can be held between multiple individuals or groups for a variety of personal, business, and entertainment-related reasons. The meetings can be held in-person or remotely (e.g., via conference and/or video calls), and can involve the use of audio-visual displays (e.g., smartboards, whiteboards, flipboards, projectors, etc.). Notes of the meetings are often taken for later review by meeting attendees, as well as others who were unable to attend the meeting.

Although meeting notes may be helpful in some situations, the process of taking the notes can be time consuming, inefficient, and otherwise problematic. For example, it can be difficult for the notetaker to transcribe meeting nuances with sufficient detail, while also being receptive to ongoing conversation. Additionally, some situations may call for concise notetaking, while other situations may call for a greater level of detail in the notetaking. It may be difficult for the notetaker to discern the level of detail required in every situation, which can lead to note inconsistencies and/or lost information. Further, every notetaker may hear and understand meeting conversations differently, leading to discrepancies between notes taken by different individuals during the same meeting.

Automatic speech recognition (ASR) technologies exist that can help to record some of the conversations occurring within a meeting. These technologies, however, may be limited. For example, ASR may be unable to process content relayed during the meeting via the audio-visual displays.

Regardless of whether meeting notes are manually or automatically taken, the process of compiling and reviewing the notes can also be cumbersome and inefficient. For example, when only concise notes are taken during a meeting, additional attendee input may be required after the meeting to fill in missing details. If the additional attendee input is not immediately pursued, some of the details may fade in the memories of the attendees. And even when the additional attendee input can fill in some of the missing details, the context of the details may still be lost.

In addition, sharing notes after a meeting is also challenging. For example, meeting notes are often shared by way of email, as a way to inform absentees of meeting content, to discuss further developments, and/or to follow up on actions items from the meeting. Unfortunately, these electronic communications can be difficult to track, manage, and record. For example, different attendees of the communications may converse at different times about different portions of the meeting and/or refer to different sections of different versions of the notes, and the email thread may soon become intractable. Unless otherwise accounted for, the content of these conversations may be lost or provide little value.

Embodiments of the disclosure address the above problems by systems and methods for logging and reviewing a meeting.

SUMMARY

Embodiments of the disclosure provide a system for logging and reviewing a meeting. The system may include a communication interface configured to receive video of the meeting captured by at least one camera device and audio of the meeting captured by at least one microphone device. The system may also include a memory having instructions stored thereon, and a processor in communication with the communication interface and the memory. The processor may be configured to execute the computer-executable instructions to generate a plurality of data streams based on the captured video and the captured audio, and to determine identifications of attendees of the meeting based on at least one of the captured video and the captured audio. The processor may also be configured to execute the computer-executable instructions to transcribe speeches of the attendees based on at least one of the captured audio. The processor may be further configured to execute the instructions to match the identifications to the plurality of data streams, and to cause a data stream of the plurality of data streams to be shown on the display based on a user-selected identification of an attendee of the meeting Embodiments of the disclosure further disclose a method for logging and reviewing a meeting. The method may include receiving, by a communication interface, video of the meeting captured by at least one camera device and audio of the meeting captured by at least one microphone device. The method may also include determining, by a processor, identifications of attendees of the meeting based on at least one of the captured video and the captured audio, and transcribing speeches of the attendees based on at least one of the captured audio. The method may further include matching the identifications to the plurality of data streams, and displaying a data stream of the plurality of data streams based on a user-selected identification of an attendee of the meeting.

Embodiments of the disclosure further disclose a non-transitory computer-readable medium storing instructions that are executable by at least one processor to cause performance of a method for logging and reviewing a meeting. The method may include receiving video of the meeting captured by at least one camera device and audio of the meeting captured by at least one microphone device, and generating a plurality of data streams based on the captured video and the captured audio. The method may also include determining identifications of attendees of the meeting based on at least one of the captured video and the captured audio, and transcribing speeches of the attendees based on at least one of the captured audio. The method may further include matching the identifications to the plurality of data streams, and displaying a data stream of the plurality of data streams based on a user-selected identification of an attendee of the meeting It is to be understood that both the foregoing general description and the following detailed description are exemplary and explanatory only and are not restrictive of the invention, as claimed.

BRIEF DESCRIPTION OF THE DRAWINGS

FIGS. 5, 6, 7, and 8 illustrate exemplary interfaces associated with a meeting logging and reviewing session, in accordance with the disclosed embodiments.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
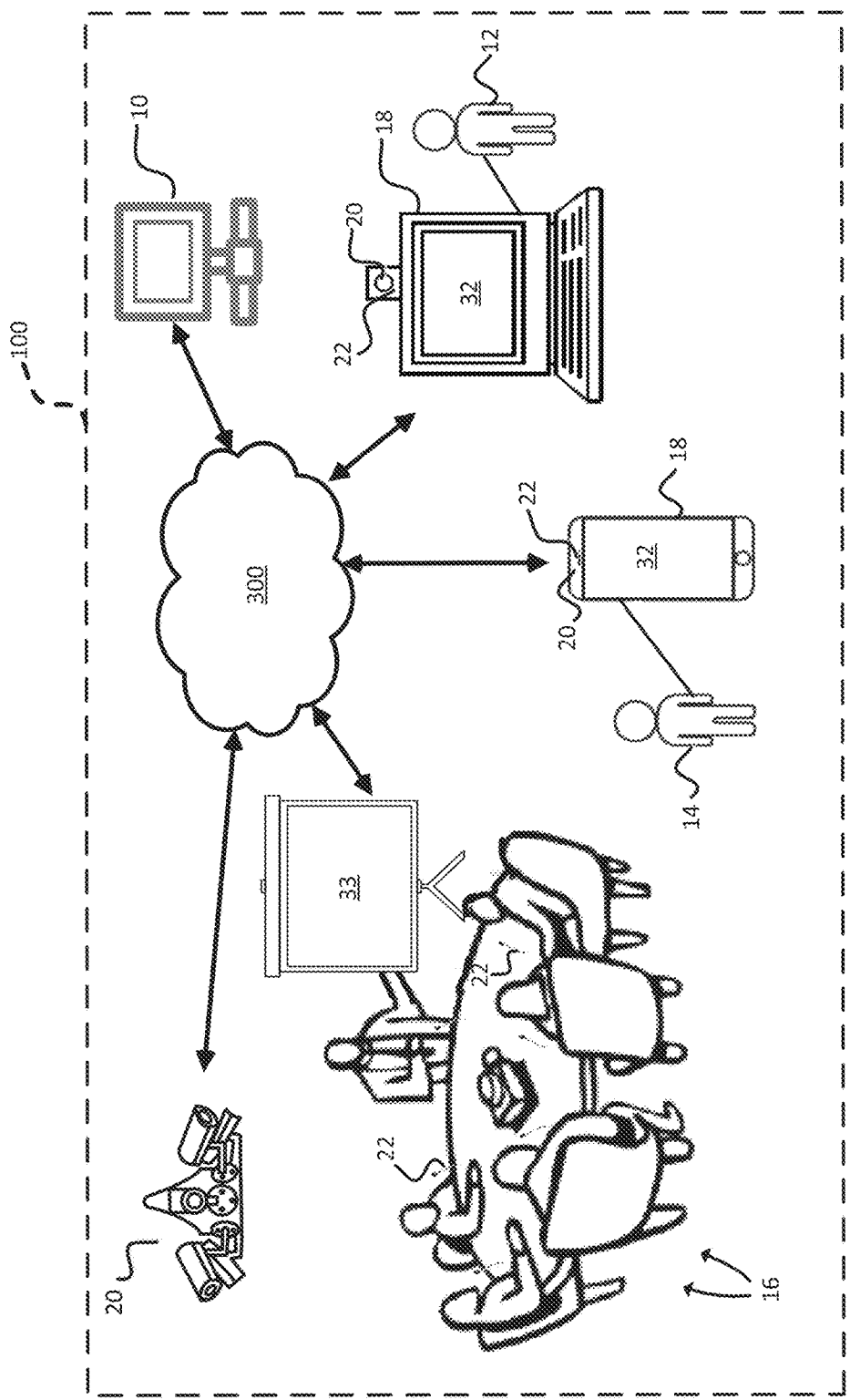
FIG. 1 illustrates a schematic diagram of an exemplary meeting logging and reviewing system, according to embodiments of the disclosure.

FIG. 1 illustrates an exemplary meeting logging and reviewing system ("system") 100, in which various implementations described herein may be practiced. System 100 represents, for example, a meeting environment that allows remote attendees (e.g., a first attendee 12 and a second attendee 14 attending from portals 18) and local attendees (e.g., a group of attendees 16 in a conference room). System 100 facilitates attendees to engage in face-to-face conversations, visual (e.g., flipboard, chalkboard, whiteboard, etc.) displays, electronic (e.g., smartboard, projector, etc.) presentations, and/or real-time audio and video sharing. For example, equipment such as a camera device 20, a microphone device 22, and a display 32 may facilitate this communication, and/or the collection, processing, and displaying of communication-related data. Multiple portals 18 and the various meeting equipment, including camera 20, microphone 22, and display 32, may communicate with each other by way of a network 300 and/or peer-to-peer connections.

System 100 includes a server 10. In some embodiments, server 160 can be a local physical server, a cloud server, a virtual server, a distributed server, or any other suitable computing device. Server 160 is configured to process the multiple stream data acquired by meeting equipment such as camera 20, microphone 22, and portals 18 and automatically create a meeting log during a meeting. In some embodiments, server 160 is further configured to share, distribute, and update the meeting log after the meeting. For example, server 160 shares the meeting log with displays 32 for users to access and provide input. Server 160 then updates the meeting log with the user input. Portal 18 may be a collection of one or more electronic devices having data capturing, data transmitting, data processing, and/or data displaying capabilities. In some embodiments, portal 18 includes a mobile computing device such as a smart phone or a laptop computer. In other embodiments, portal 18 includes a stationary device such as a desktop computer or a conferencing console.

Each camera device 20 may be a standalone device communicatively coupled (e.g., via wires or wirelessly) to the other components of portal system 100, or an integral device that is embedded within portal 18. Camera device 20 can include various components such as one or more processors, a camera, a memory, and a transceiver. It is contemplated that camera device 20 can include additional or fewer components. Camera device 20 may include one or more sensors for converting optical images to digital still image and/or video data. The one or more image sensors can include known sensors such as semiconductor charge-coupled devices (CCD), complementary metal-oxide-semiconductor (CMOS) devices, and other devices capable of capturing image or video data.

Camera device 20 is configured to capture and provide one or more video streams related to the meeting. For example, camera device 20 can be configured to capture the meeting attendees, and their actions and reactions during the meeting. Camera device 20 can be configured to capture content presented or otherwise displayed during the meeting, such as writing and drawings on a whiteboard or paper flipper, and projected content on a projector screen 33.

Consistent with the present disclosure, at least one camera device 20 includes a camera array with 360-degree Field of View (FoV) configured to capture a set of images or videos with overlapping views. These images or videos may or may not be stitched to form panorama images or videos. For a local meeting, a 360-degree FoV camera can record the entire conference rooms, all the attendees, and all the displayed content throughout the entire meeting. Capturing all the attendees and their actions enables system 100 to identify an active attendee (e.g., one who is presenting) at any time, or to track a particular attendee (e.g., CEO of the company) throughout the meeting. In some embodiments, camera devices 20 integrated on portals 18 may include a single camera or a narrow FoV camera because portals 18 are typically used by a single user.

Each microphone device 22 may be a standalone device communicatively coupled (e.g., via wires or wirelessly) to the other components of system 100, or an integral device that is embedded within portal 18. In some embodiments, microphone device 22 can include various components such as one or more processors, a microphone, a memory, and a transceiver. It is contemplated that microphone device 22 can include additional or fewer components. Microphone device 22 can include one or more transducers for converting acoustic waves that are proximate to microphone to a stream of digital audio data. In some embodiments, microphone device 22 transmits a microphone feed to server 10, including audio data. Consistent with the present disclosure, at least one microphone device 22 may include a microphone array (i.e., a mic-array). The use of mic-array to capture meeting sound can help record attendees' speeches more clearly which will improve the accuracy of later automatic speech recognition. A mic-array can also help to differentiate among different speakers' voices when they talk at the same time.

Camera devices 20 and microphone devices 22 can packetize and transmit video and audio feeds to server 10 through network 300. Data transmission may be in real-time, e.g., using streaming, or intermittently after each set time interval. In some embodiments, network 300 may include, alone or in any suitable combination, a telephone-based network (such as a PBX or POTS), a local area network (LAN), a wide area network (WAN), a dedicated intranet, and/or the Internet. Further, architecture of network 300 may include any suitable combination of wired and/or wireless components. For example, the architecture may include non-proprietary links and protocols, or proprietary links and protocols based on known industry standards, such as J1939, RS-232, RP122, RS-422, RS-485, MODBUS, CAN, SAEJ1587, Bluetooth, the Internet, an intranet, 802.11 (b, g, n, ac, or ad), or any other communication links and/or protocols known in the art.

Each display 32 may include a liquid crystal display (LCD), a light emitting diode (LED) screen, an organic light emitting diode (OLED) screen, and/or another known display device. Display 32 may be used to display video signals, graphics, text, and/or audio signals to a remote meeting attendee.

Projector screen 33 may be an installation consisting of a surface and a support structure used for displaying a projected image for the view of the meeting attendees. Projection screen 33 may be permanently installed, painted on the wall, or portable with tripod or floor rising models. In some embodiments, projector screen 33 may be a pull-down screen where the screen fabric is rolled in the screen case when not used to save space. Projector screen may include a reflective surface that is uniformly white or grey. Projector screen 33 is configured to show projected information such as videos, graphics, presentation slides, texts, etc. In some embodiments, a display may be used instead of projector screen 33 to display the information.

Figure 2:
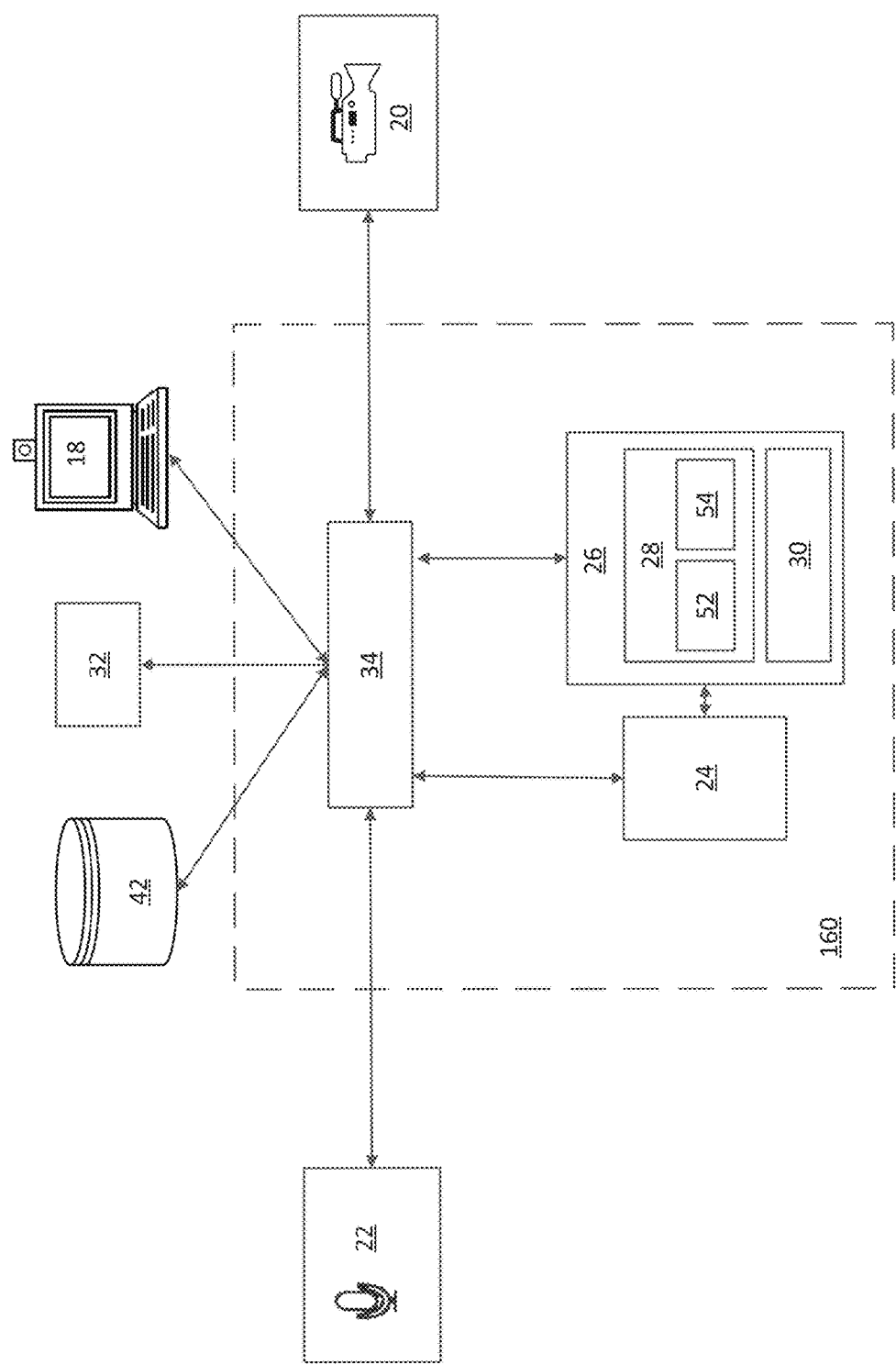
FIG. 2 is a block diagram of an exemplary server that may be used in the meeting logging and reviewing system of FIG. 1.

FIG. 2 is a block diagram of an exemplary server 160 that may be used in the meeting logging and reviewing system of FIG. 1. Server 160 is configured to receive multiple auxiliary streams and generate meeting records that preserve meeting details and facilitate matching of meeting content and attendees. Server 160 may also enable multi-faceted reviewing and interaction of the meeting notes. Server 160 may further allow post-meeting reaction to meeting notes via amendment streams.

In some embodiments, as shown in FIG. 2, server 160 may include a processor 24, a memory 26 that having a program 28 stored thereon, and I/O devices 34. In some embodiments, server 160 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of server 160 may be located in a cloud, or may be alternatively in a single location (such as inside vehicle 100 or a mobile device) or distributed locations. Components of server 160 may be in an integrated device, or distributed at different locations but communicate with each other through a network (not shown).

Processor 24 can include one or more processing devices configured to perform functions of the disclosed methods. Processor 24 may include any appropriate type of general-purpose or special-purpose microprocessor, digital signal processor, graphic processor, or microcontroller. In some embodiments, processor 24 can constitute a single core or multiple cores executing parallel processes simultaneously. For example, processor 24 can be a single-core processor configured with virtual processing technologies. In certain embodiments, processor 24 uses logical processors to simultaneously execute and control multiple processes. Processor 24 can implement virtual machine technologies, or other known technologies to provide the ability to execute, control, run, manipulate, and store multiple software processes, applications, programs, etc. In another embodiment, processor 24 includes a multiple-core processor arrangement (e.g., dual core, quad core, etc.) configured to provide parallel processing functionalities that allow server 160 to execute multiple processes simultaneously. As discussed in further detail below, processor 24 may be specially configured with one or more applications and/or algorithms for performing method steps and functions of the disclosed embodiments. For example, processor 24 can be configured with hardware and/or software components that enable processor 24 to receive real-time camera feed, receive real-time audio feed, record video, record audio, receive user-provided control instructions regarding video and/or audio playback, and selectively transmit to server 160 the real-time camera feed, the real-time audio feed, the recorded video, the recorded audio, and other associated data streams based on the control instructions. It is appreciated that other types of processor arrangements could be implemented that provide for the capabilities disclosed herein.

Memory 26 may include a volatile or non-volatile, magnetic, semiconductor, tape, optical, removable, non-removable, or other type of storage device or tangible and/or non-transitory computer-readable medium that stores one or more executable programs 28, such as a meeting logging and reviewing app 52 and data 30. Data 30 can include, for example, information that is personal to a meeting attendee (e.g., voice identification patterns, facial recognition features, etc.), account information, settings, and preferences.

In some embodiments, programs 28 include an operating system 54 that performs known functions when executed by processor 24. By way of example, the operating system may include Microsoft Windows™, Unix™, Linux™, Apple™ operating systems, Personal Digital Assistant (PDA) type operating systems such as Microsoft CE™, or another type of operating system. Programs 28 may also include communication software that, when executed by processor 24, provides communications with network 300 (referring to FIG. 1), such as Web browser software, tablet or smart handheld device networking software, etc.

Meeting logging and reviewing app 52 may cause processor 24 to perform processes related to generating, transmitting, storing, receiving, indexing, and/or displaying audio and video in association with other attendees of a meeting. For example, meeting logging and reviewing app 52 may be able to configure portal 18 to perform operations including: capturing a real-time (e.g., live) video stream, capturing a real-time (e.g., live) voice stream, displaying a graphical user interface (GUI) for receiving control instructions, receiving control instructions from the associated user via I/O devices 34 and/or the user interface, processing the control instructions, sending the real-time video and/or audio based on the control instructions, receiving real-time video and/or audio from other portals 18, and playing back selected streams of the video and audio in a manner customized by the user.

I/O devices 34 may be configured to send and receive information. I/O devices 34 may include, for example, a keyboard, buttons, switches, a touchscreen panel, and/or a speaker. I/O devices 34 may also include one or more communication interfaces (not shown) for sending information to and receiving information from other components of system 100 via network 300. In some embodiments, I/O devices 34 can include an integrated services digital network (ISDN) card, cable modem, satellite modem, or a modem to provide a data communication connection. As another example, I/O devices 34 can include a local area network (LAN) card to provide a data communication connection to a compatible LAN. Wireless links can also be implemented by I/O devices 34. In such an implementation, I/O devices 34 can send and receive electrical, electromagnetic or optical signals that carry digital data streams representing various types of information via network 300.

Database 42 may be a data storage device that stores auxiliary information on meeting attendees. Database 42 may include a volatile or non-volatile, magnetic, semiconductor, tape, optical, removable, non-removable, or other type of storage device or tangible computer-readable medium. In some embodiments, database 42 may be a local database or a cloud database.

In some embodiments, auxiliary information on meeting attendees may include, e.g., user identification information such as ID numbers and biometric information, user calendar information that includes meeting schedule or meeting invitations, and other user characteristics such as body characteristics, facial characteristics, voice characteristics, preferences, etc. Consistent with the present disclosure, processor 24 may retrieve the auxiliary information on meeting attendees from database 42 through I/O devices 34, and use such auxiliary information to aid processor 24 to perform the operations. For example, the auxiliary information may be used to identify a meeting attendee as captured on video and audio.

In some embodiments, server 160 may retrieve or otherwise receive video and/or audio inputs from one or more portals 18 through I/O devices 34. In some embodiments, the video and/or audio inputs may be created by a user (e.g., a meeting attendee or a non-attendee) after the meeting when reviewing the meeting log. For example, the audio input may include voice comments by a user. Consistent with the present disclosure, processor 24 may use the video and/or audio inputs to generate amendment streams, which are then used to update the meeting log.

Figure 3:
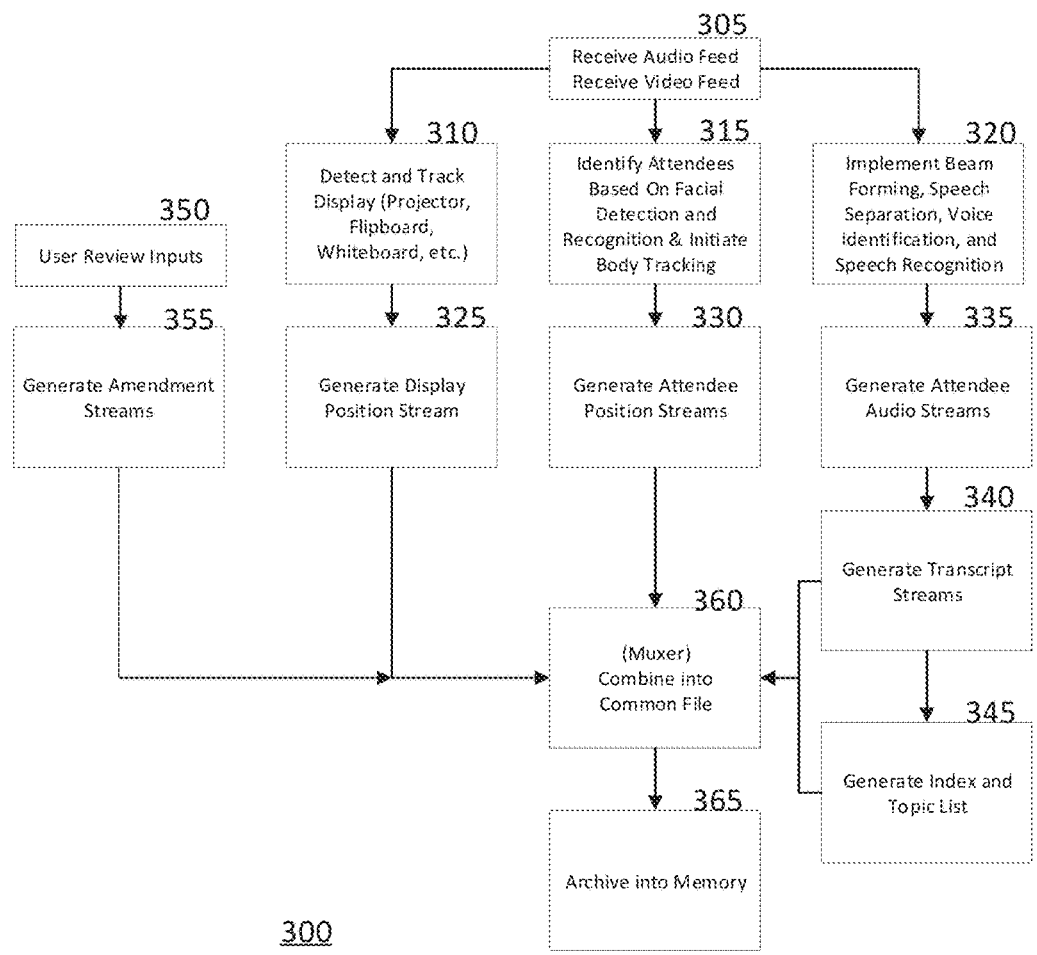
FIGS. 3 and 4 are flowcharts of exemplary processes for managing meeting data, in accordance with embodiments of the present disclosure.
Figure 4:

FIGS. 3 and 4 illustrate flowcharts of example methods 300 and 400, respectively, for logging and reviewing meeting-related data. Methods 300 and/or 400 can be performed by the various devices disclosed above. For example, in some embodiments, methods 300 and/or 400 are performed by server 160.

Method 300 may be implemented at in real-time throughout a meeting. Method 300 may begin with the receiving of audio and video feeds from one or more camera devices 20 and one or more microphone devices 22, as well as one or more portals 18 via network 300 (Step 305). In some embodiments, multiple audio and/or multiple video feeds may be simultaneously received.

For example, microphone device 22 may include an array of microphones located within a conference room and configured to capture audio from all attendees and/or the audio-visual displays within the room environment. Additionally or alternatively, one or more microphone devices 22 may be provided to each of the attendees (e.g., each of the local attendees and/or the remote attendees) of the meeting for use in separately capturing voices of the attendees. In some embodiments, microphone device 22 may be situated to capture local meeting room audio, while one or more additional microphone device 22 may be located remotely to capture voices of remote attendees of the meeting. Likewise, one or more additional microphone device 22 may be located for use in capturing audio associated with any displays presented during the meeting. It should be noted that a greater number of microphones inside microphone device 22 used to capture audio during the meeting may help to more clearly pick up attendee speech and differentiate between overlapping speakers' voices and other environmental noise (e.g., display audio). This may improve an accuracy of subsequent audio processing (e.g., speech recognition), as will be described in more detail below.

Similarly, camera device 20 may include an array of cameras located within the conference room and configured to capture a multiple overlapping videos each having a limited (e.g., 90°) field of view of the room. The panoramic video captures all the meeting attendees, their actions and reactions, as well as any content on projector screen 33 or other displays. Consistent with the present disclosure, the multiple overlapping videos may or may not be stitched to form a panorama video. Additionally or alternatively, camera device 20 may be provided to each of the attendees of the meeting for use in separately capturing video of the attendees. In some embodiments, camera device 20 may be situated to capture local meeting room video, while one or more additional camera device 20 may be located remotely to capture video of remote attendees of the meeting. Likewise, camera device 20 may be provided for use in capturing video associated with any displays presented during the meeting. It should be noted that a greater number of cameras in camera device 20 used to capture video during the meeting may help to ensure that a greater number of actions and reactions of the attendees during the meeting, as well as displayed content, is simultaneously captured, regardless of which attendee is actively speaking. As will be described in greater detail below, this may allow a viewer to visually track a specific attendee of the meeting during subsequent playback.

Method 300 may continue with detection of the existence, location, and/or usage of visual displays within the meeting room based on the multiple overlapping views captured by the associated camera device 20 during the meeting (Step 310). This detection can be made in any number of ways. For example, a conventional feature-based method (e.g., a method based on a rectangular shape of a flipboard, whiteboard, screen or TV monitor; a color or brightness contrast of the display against a surrounding area; etc.) or a machine learning approach may be used. In some embodiments, the machine learning methods may use a deep neural network (DNN).

Once detection of a display has been made, a spatial position of the corresponding video being captured may be obtained. The spatial position may be represented, for example, by a bounding shape (e.g., a box or rectangle), using either coordinate tuples of the rectangle's vertices or a coordinate of a one vertex (e.g., an upper left corner of the display) and known dimensions of the display (e.g., a width and a height of the rectangle) as expressed in pixels.

It may be possible during a particular meeting for a relative location of the display to shift (e.g., when the display is moved, when a corresponding projector is moved, and/or when camera device 20 capturing video of the display is moved). For this reason, it may be beneficial to track the position of the display. This may be done, for example, by detecting the display within every captured frame of video. Alternatively, differences within captured video of an area of the meeting room surrounding the display may be determined, assuming that the area surrounding the display is relatively stable (e.g., objects within the area are substantially stationary). In other words, as long as little or nothing changes in the video of the area surrounding the originally detected location of the display, it can be concluded that the location of the display has remained the same. When the location of the display becomes suspect (e.g., when the differences in the captured video of the area surrounding the originally detected location of the display are greater than a threshold), the original detection process may be repeated. As will be described in more detail below, the recorded location of the box bounding each display may be used as a view port (e.g., as a filter for selecting and cropping only a subset of a the multiple overlapping views captured by camera device 20) during a reviewing and/or streaming process.

The location of the display may be continuously recorded and packaged together with time information to generate a Display Position Stream (DPS) (Step 325). The DPS may consist of one or more records and have the following format:

[Time Duration (TimeStamp_start, TimeStamp_end), Projector Display ID, Bounding Box (Top-left corner coordinate, width, height)];

wherein:

Time Duration is a duration from first detection of the display to a current time period during which the display is still being detected or to a time when the display is no longer detectable;

Projector Display ID is an identifier automatically assigned to the detected display (based on an order of detection or a detected display type, if multiple displays are detected), a detected identifier (e.g., detected based on captured video), or an identifier manually assigned at a start of the meeting; and Bounding Box includes either the coordinate tuples or the vertex and corresponding dimensions discussed above.

Throughout the meeting (e.g., at the same time as completing step 310), the faces of the attendees may be detected, the attendees may be recognized based on facial detection, and the bodies of the attendees thereafter may be tracked (Step 315). Facial detection may be performed using, for example, an online (e.g., cloud-based) artificial intelligence service, an on-device deep-learning method, an offline face software development kit, or another similar technology. Via these technologies (and others), a library of identifying facial characteristics may be generated for each attendee in the meeting.

The library of identifying facial characteristics of each attendee may then be associated with known attendee information (e.g., auxiliary information on meeting attendees). The known attendee information may include, for example, a meeting schedule, a meeting invitation, a real-world identification, and other auxiliary information. The known attendee information may be stored locally (e.g., as data 30 within memory 26) or on a cloud database such as database 42, populated in advance, and/or selectively updated throughout the meeting. It should be noted that, when the real-world identification of an attendee is unknown (e.g., not yet stored within memory 26 or database 42), a generic identification (e.g., attendee0, attendee1, etc.) may be automatically assigned to the attendee, for purposes of indexing recorded information. These generic identifications may be restored opportunistically later in current meeting or other meetings the attendee have participated or will participate.

Each user's body may be tracked during the meeting, and positions of the bodies may be continuously recorded. Tracking may be accomplished by generating a virtual box that tightly encompasses each attendee's body at its detected location, and recording vertex coordinates and/or dimensions of the box (e.g., in a manner similar to that is used to track the bounding box around the display described above). In some instances, it may be beneficial to generate an update buffer around the bounding box encompassing each attendee's body. This buffer may allow for normal body movements, without needing to constantly record changes in the position of the attendee. In other words, only when the tracked body of an attendee moves outside of the update buffer, will the position of the tighter bounding box be updated. In one example, the buffer is provided in the way of a looser box around the tighter bounding box. The looser box may be, for instance, about 20% larger than the tighter bounding box. As will be described in more detail below, the recorded location of the box tightly bounding each attendee may be used as a view port (e.g., as a filter for selecting and cropping only a subset of the multiple overlapping views captured by camera device 20) during a reviewing and/or streaming process.

It may be possible, in some instances, for the bounding boxes of adjacent attendees to overlap. In order to reduce a frequency of position updates for these attendees, updates may be performed only when an amount of overlap is excessive. For example, only when a ratio of an area of intersection to a sum of non-intersecting areas (a.k.a., intersection over union) of the overlapping boxes exceeds a threshold amount, will the update be performed.

The location of each identified attendee may be continuously recorded and packaged together with time information to generate an Attendee Position Stream (APS) (Step 325). The APS may consist of one or more records and have the following format:

[Time Duration (TimeStamp_start, TimeStamp_end), User ID, Bounding Box (Top-left corner coordinate, width, height)];

wherein:

Time Duration is a duration from first detection of the particular attendee to a current time period during which the attendee is still being detected or to a time when the attendee is no longer detectable;

User ID is a generic identifier automatically assigned to an unrecognized attendee, a real-world identifier automatically assigned to a recognized attendee, or an identifier (generic or real-world) manually assigned to an attendee; and Bounding Box includes either the coordinate tuples or the vertex and corresponding dimensions discussed above.

The audio feed received at Step 305 may be processed at a Step 320, at the same time as Step 310 and Step 315. This processing may include, among other things, implementation of beam forming, speech separation, voice identification, and speech recognition based on one or more streams of audio captured by one or more microphones. Beam forming is the spatial filtering of different streams of audio, to determine an arriving angle of speech within the meeting room (i.e., to determine an origin of each voice stream). In one example, the video being recorded is analyzed (e.g., via active speaker detection) to extract the angle of speech arriving from each attendee. This information can then be combined with audio information (e.g., a volume and/or quality of audio) collected from each individual microphone to facilitate separation of a mix of all ongoing attendee speech into individual voice streams. Each individual attendee's voice stream may then be compressed (e.g., via MP3, AAC, etc.) and stored for later retrieval and playback.

In some embodiments, the individual voice streams may be recognized and linked to identified attendees. This may be accomplished, for example, via voiceprinting technology. A voiceprint, like a fingerprint, includes a collection of characteristics that are unique to a particular attendee (e.g., to the attendee's voice). These characteristics can be expressed digitally, visually, and/or mathematically (e.g., as formulas). By comparing characteristics of each voice stream collected via microphone device 22 to known characteristics (e.g., characteristics stored locally as data 30 in memory 26 or stored within a database 42) of potential attendees, each voice stream may be linked to a known attendee of the meeting (e.g., when the comparison with a particular stored characteristic indicates a high-confidence match). This linking may be strengthened when the particular attendee is also linked based on the known location and visually recognized identity of the attendee coinciding with the origin of the associated voice stream. When the comparison of characteristics of a particular voice stream with known characteristics results in a low-confidence match (or no match at all), the voice stream may simply be linked to a particular attendee based on the origin of the stream and the identity (e.g., visually recognized identity or assigned identity) of the attendee located at the origin.

The individual voice streams may be continuously recorded and packaged together with attendee identification and/or time information to generate a Voice Stream (VS) (Step 335). The VS may consist of one or more records and have the following format:

[Time Duration (TimeStamp_start, TimeStamp_end), User ID];
wherein:
Time Duration is a duration from a start of the associated voice stream to a current time period or a stop of the voice stream; and
User ID is a generic identifier automatically assigned to an unrecognized attendee, a real-world identifier automatically assigned to a recognized attendee, or an identifier (generic or real-world) manually assigned to an attendee.

The individual voice streams may be automatically transcribed, if desired. Transcription of the individual voice streams may be automatically accomplished, for example, via an online (e.g., cloud-based) automatic speech recognition service, an on-device deep-learning method, an offline speech recognition software, or another similar technology. Any known text format (e.g., a Timed Text Format—TTF) may be utilized. Text resulting from the automatic speech recognition technology may be continuously recorded and packaged together with attendee identification and/or time information to generate a Transcript Stream (TS) (Step 340). The TS may consist of one or more records and have the following format:

[Time Duration (TimeStamp_start, TimeStamp_end), User ID, Sentence Text];
wherein:
Time Duration is a duration from a start of the associated transcript to a current time period or an end of the transcript;
User ID is a generic identifier automatically assigned to an unrecognized attendee, a real-world identifier automatically assigned to a recognized attendee, or an identifier (generic or real-world) manually assigned to an attendee; and
Sentence Text includes the automatically recognized text.

Transcripts of the different voice streams may be collected and used to construct a database that can later be used to search, retrieve, and playback particular (e.g., user-selected) aspects of the meeting. For example, an indexing engine may receive the voice streams and map words and/or phrases of the associated text to stream elements (e.g., to time sections of particular streams, to the identification of the attendee assigned to the stream, etc.). In addition, the transcribed text may be distilled into summaries and classified into any number of different topics. In one embodiment, long short-term memory units are arranged into layers of a recurrent neural network and used for storing the classifications. A recurrent neural network may be well-suited to storage of the classifications, because of unknown durations of discussion topics, a time between discussions of different topics, and/or recurrent discussions of past topics. The index and a list of the topics may be generated, recorded and packaged together with time information (Step 345). In some embodiments, the detected topics may be coalesced (e.g., based on commonalities) prior to generation of the list. The list may have the following format:

[Topic SN, Topic Summary, Time Span 1 (TimeStamp_start, TimeStamp_end), . . . , Time Span N (TimeStamp_start, TimeStamp_end)].
wherein:
Topic SN is a sequence number;
Topic Summary is a brief summary of an associated topic; and
Time Span is a duration from first detection of the topic discussion to a current time period or detected end of the topic discussion.

It should be noted that, when multiple discussions occurring at different times are associated with the same discussion topic, the topic list may include multiple time spans for a give topic due to the coalescing discussed above. It should also be noted that, during the normal course of a meeting, action items may arise and/or be assigned for completion by particular attendees. These action items may each be listed as separate topics within the topic list.

As will be described in more detail below, various aspects of the meeting may be selectively viewed in real-time and/or played back after conclusion of the meeting, e.g., from portal 18 or some other devices unrelated to the meeting. During these viewings, a user may provide review inputs such as reactions, comments, and/or notes related to what is being viewed and heard. It is contemplated that this reaction content could be selectively captured (e.g., via audio and/or video recording by microphone device(s) 22 and/or camera device(s) 20) and associated with the aspects of the meeting being viewed. The review inputs may be provided by portal 18 to server 160 (Step 350). The reaction content may undergo some or all of the same processing described above (e.g., facial detection, identity recognition, body tracking, beam forming, speech separation, voice identification, speech recognition, transcribing, indexing, summarizing, topic classifying, etc.), linked to a temporal movement associated with the aspects of the meeting being viewed, and/or tied to the associated topic. This information may then be used to generate an Amendment Stream (AS) (Step 355). The AS may consist of one or more records and have the following format:

[Ref Src TimeStamp, UserID, Ref Topic SN, Time Duration (TimeStamp_start, TimeStamp_end), StreamContent (base64Binary)|Link to Files];
wherein:
Ref Src TimeStamp is a time stamp associated with the aspect of the meeting being viewed;
User ID is a generic identifier automatically assigned to the user, a real-world identifier automatically assigned to the user, or an identifier (generic or real-world) manually assigned to the user;
Ref Topic SN is a sequence number of the topic associated with the aspect of the meeting being viewed
Time Duration is a duration from a start of the associated aspect being viewed to a current time period or a stop of the aspect being viewed; and
StreamContent(base64Binary) (Link to Files is the actual content being recorded (in this example, via a base-64 binary encoding scheme) or a link to files associated with the aspect being viewed.

The meeting data generated during completion of Steps 310-355 (e.g., the DPS, APS, VS, CS, index data base, topic list, and AS) may be packaged together into one or more compressed files (e.g., zip files), for purposes of portability (Step 360). The process of packaging the data may be known as multiplexing. In this situation, the actual audio and/or video recordings made by microphone devices(s) 22 and/or camera devices(s) 20 may be kept separate and referenced to by the other file(s). Alternatively, XML may be used to wrap the recordings together with the meeting data (e.g., within a .mas format). For example, each stream may be converted to a segment of an XML file (e.g., enclosed within a type name). For the purposes of this disclosure, the meeting data may be considered a form of meeting notes, while the meeting data together with the actual audio and/or video recordings may be considered a meeting log. The CS, alone, may be comparable to a complete and accurate version of conventional (e.g., hand or typewritten) meeting notes, while the topic list may be comparable to a concise version of conventional meeting notes. The multiplexed data files may be archived into memory 26 or a separate storage device internal or external to server 160 (Step 360).

It should be noted that the meeting data may be editable. For example, the data may be directly edited via a plain text editor or an XML editor. This may allow for correction of occasional errors produced by the automatic speech recognition technology, for correction of errors produced by the automatic attendee identification technology, and/or for replacing of automatically assigned attendee identification with real-world identification. The editing may be manually performed, automatically performed, or performed by a hybrid of manual and automatic processes. For example, a manual correction made a first time at a single temporal location within the meeting data may be automatically propagated to every occurrence of the same error.

Method 400 (referring to FIG. 4) may be implemented during and/or after conclusion of a meeting. Method 400 may begin with the display of a graphical user interface (GUI) on display 32 (referring to FIG. 1) (Step 405). Exemplary GUIs are illustrated in FIGS. 5, 6, 7, and 8, and will be discussed in more detail below. The user may be able to provide input selections and/or meeting parameters via the GUI. These meeting parameters may include, for example, a date, a time, and/or a title of a particular meeting that the user wishes to review. The meeting parameters may be received (Step 410) via I/O devices 34, and used to retrieve one or more compressed files stored in memory 26 or a separate storage device of server 160 that correspond with the particular meeting (Step 415).

The compressed file(s) (e.g., the .mas file) may then be separated into different data streams (e.g., the DPS, APS, VS, CS, index data base, topic list, and AS) (Step 420) in a reverse manner relative to Step 360 described above. The process of separating the file(s) may be known as demultiplexing. Additional options may then become available for selection by the user via the GUI. For example, the topic list, the index, a list of meeting attendees, a list of display devices used during the meeting, and/or various time-related options may be shown.

A selection from the user may then be received, including search criteria associated with the different data streams and options discussed above (Step 425). For example, the user may be able to pick a particular topic to follow, input one or more key words, identify an attendee of the meeting, choose a particular display to view, and/or select a time period within the meeting. Based on these selections, any number of different searches and/or filters of the separated data streams may then be applied.

For example, a spatial search may be implemented (Step 430). The spatial search may be a search for a user-selected portion of the multiple overlapping views captured by camera device(s) 20 that correspond with the tracked body positions of one or more identified (e.g., facially recognized) attendees and/or locations of one or more displays used during the meeting. For instance, the user may select to view only attendee1 and/or only a projector screen, and the spatial search may retrieve from the DPS and/or from the APS corresponding video of only the location(s) where attendee1 and/or the projector screen are positioned.

The video from the DPS and/or the APS may need to be cropped in order to return only the viewable aspects (e.g., only the display and/or attendee within the corresponding bounding boxes) selected by the user of portal 18. In some instances, this may require that the originally recorded video be decoded (e.g., via a conventional video transcoder) so that only portions of individual frames can be retained and viewed. Each cropped portion of the originally recorded video may have a standard size (e.g., about 1280×720, about 1920×1080, etc.) to provide familiar viewing experiences to the user.

A video temporal search may also be implemented (Step 435). The video temporal search may be a search for a user-selected timing (e.g., start time, end time, and/or duration) of the cropped views. For instance, the user may select to view only the last three minutes of the meeting. The video temporal search may return only portions of the above-described cropped video from the DPS and/or APS that correspond with the user-selected timing (e.g., only the last three minutes of the video of only the locations within the bounding boxes where attendee1 and/or the projector screen are positioned).

An audio temporal search and ID filtering may also be implemented (Step 440). The audio temporal search may be a search for the user-selected timing (e.g., start time, end time, and/or duration) of audio recorded during the meeting. This search may return all audio from the VS recorded in association with the user-selected timing. The returned audio may then be filtered based on the user-selection made in Step 430. Specifically, the returned audio may be filtered accordingly to attendee identification and/or display identification. For example, the search may return audio from only the last three minutes of the meeting that originated from only the position(s) of attendee1 and/or the projector display screen.

A transcript temporal search and ID filtering may also be implemented (Step 445). Similar to Step 440, Step 445 may include the searching for the user-selected timing (e.g., start time, end time, and/or duration) of transcript generated during the meeting. This search may return all captioning from the CS recorded in association with the user-selected timing. The returned transcript may then be filtered based on the user-selection made in Step 430. Specifically, the returned transcript may be filtered accordingly to attendee identification and/or display identification. For example, the search may return transcript associated with only the last three minutes of the meeting based on only the audio that originated from only the position(s) of attendee1 and/or the projector display screen.

Once all of the user selections have been made and the corresponding audio, video, and transcript returned, the meeting data may be played back on display 32 of portal 18 (Step 450). It should be noted that multiple video clips (e.g., of an attendee and a display, of different attendees, of an attendee and a meeting log reviewer, etc.) may be played back at the same time, if desired (e.g., via picture-in-picture, multiple virtual windows, etc. that may be available via the GUIs of FIGS. 5, 6, 7, and 8). As will be described in more detail below, the user may be able to control the manner in which the meeting data is played back.

During the playback of audio, video, and/or transcript on display 32 of portal 18, reactions and/or comments from the user viewing the meeting data may be selectively recorded (e.g., via camera device 20, and/or microphone device 22) (Step 455). These reactions and/or comments may be recorded only when triggered by the user or recorded automatically anytime meeting data is being played back. As described above, the recorded reactions and/or comments may be provided to server 160, which may link them to the other meeting data being viewed (e.g., according to timing, topic, attendee, key word, etc.), and record the aggregated data as an amendment to the meeting (e.g., as the AS).

In some embodiments, the video, audio, transcript, and/or reactions returned from the searching, filtering, and commenting of Steps 430-445 and 455 may be packaged together for archiving, streaming, and/or remote viewing (Step 460). For example, the extracted portions of the various meeting data streams may be wrapped together into a standard audio/video container format (e.g., .mp4, .h264, .mov, etc.). In some applications, default searching and filtering may be automatically performed at conclusion of every meeting, to return default audio, video, transcript, and commenting that are most commonly requested and/or viewed by users. For example, an active speaker audio/video/transcript/commenting file and/or an active display audio/video/transcript/commenting file may be automatically generated at conclusion of each meeting.

FIGS. 5, 6, 7, and 8 illustrate different ways in which meeting data can be viewed and/or interacted with by a user of portal 18. As seen in FIG. 5, the GUI shown on display 32 of portal 18 may include a primary video display area ("primary area") 56, a secondary video display/interaction area ("secondary area") 58, a comment button 60, a topic list button 62, and a search button 64. It should be noted that comment, topic list, and/or search buttons 60-64 may be virtual buttons or physical buttons. It should also be noted that the GUI is exemplary only, and may include a different number and/or types of display areas and buttons, if desired. The areas and buttons may be arranged differently from those illustrated in FIGS. 5, 6, 7, and 8.

As shown in FIG. 5, primary area 56 may consume a larger portion of the displayed GUI, and may be intended for showing of the user-selected video content (e.g., of attendee1 or the projector screen). Any associated transcript may overlay the video content, for example at a lower edge of primary area 56. As shown in FIG. 6, a temporal progress bar 66 may alternatively or additionally overlay the video content, for example also at the lower edge of primary area 56. By way of temporal progress bar 66, the user may be able to manipulate (e.g., rewind, fast-forward, skip, pause, stop, accelerate, etc.) playback of the audio and video content. Temporal progress bar 66 may be selectively hidden (e.g., manually by the user or automatically after a period of no input from the user) and selectively recalled (e.g., via manual tapping within or movement over primary area 56).

In some instances, comments from meeting-log reviewers may have been previously recorded and are also available for playback. In these instances, one or more indicators (e.g., colored markers) 68 of the associated AS may be shown together with temporal progress bar 66. For example, solid yellow downward-pointing arrows are shown in FIG. 7 as located along temporal progress bar 66 at positions associated with their relative temporal occurrences. In addition, a characteristic of indictors 68 (e.g., a size, such as a height or width) may correspond with a duration of the associated comment. Indicators 68 may be selectable (e.g., clickable) by the user to immediately advance the associated playback to the time of the comment and/or to immediately initiate playback of the comment (e.g., alone as the only content playing within primary area 56 or in addition to the playback of the associated meeting video content).

Secondary area 58 may be smaller than primary area 56, and have multiple purposes. For example, secondary area 58 may be used to show the full video formed by the multiple views of the associated meeting, while primary area simultaneously shows only the cropped portions of the video corresponding to the selected attendee or display (shown in FIG. 6). In this example, the full video may be scaled down to about $\frac{1}{8}^{th}$ its original width and height. In another example, secondary area 58 may be used to show a default view of the meeting (e.g., a view of the active speaker or the display used during the meeting), while primary area 56 is showing another view (e.g., a view of the selected attendee that is not necessarily the active speaker, the full video, etc.). In addition, as shown in FIG. 7, secondary area 58 may be used to switch (e.g., by tapping or clicking) between any number of different default views shown as thumbnails 69 within secondary area 58 and the larger video content shown within primary area 56.

In some embodiments, comment Button 60 may be located in an upper-right corner of the displayed GUI, and selectively activated by the user (e.g., via tapping or clicking) to allow the user to comment on the video, audio, and/or transcript being shown on display 32. Upon activation of comment button 60, camera and/or microphone devices 20, 22 may start recording reactions and/or input from the user. This recording may then be processed for use in generating the AS described above, and linked to the video, audio, and/or transcript being shown. In the disclosed embodiment, comment button 60 is represented by a "#" sign. It is contemplated, however, that comment button 60 may be represented in other ways.

In some embodiments, topic list button 62 may be located in a lower-left corner of the displayed GUI, and selectively activated by the user (e.g., via tapping or clicking) to cause the topic list (i.e., the list of topics discussed during the current meeting) to pop up on display 32. The user may then be able to choose one of the topics from the list, and the associated audio, video, and/or transcript associated with the chosen topic may then switch to the temporal and spatial locations of discussion of the topic during playback. In the disclosed embodiment, topic list button 62 is represented by an image of a human hand with one finger pointing upward. It is contemplated, however, that topic list button 62 may be represented in other ways.

In some embodiments, search button 64 may be located in the lower-right corner of the displayed GUI, and selectively activated by the user (e.g., via tapping or clicking) to initiate searching of transcribed text and/or topics within the meeting data in the selected file. When search button 64 is activated, a text input dialogue may appear for receipt of the search parameters. In the disclosed embodiment, search button 64 is represented by an image of human eyes. It is contemplated, however, that search button 64 may be represented in other ways.

In some embodiments, one or more additional buttons may be selectively displayed within secondary area 58. These buttons may allow the user to alter the way in which audio and/or video content is displayed. As can be seen in FIG. 8, these buttons may include a "Follow This Topic" button 70, a "Follow This Attendee" button 72, and a "Sequential Play" button 74. During viewing of any video content, when the user selects (e.g., taps or clicks on) button 70, the current playback of meeting content may switch from a current playback format (e.g., from either an attendee-focused playback or a sequential playback) to playback that follows a current topic being discussed. It should be noted that, in this instance, the meeting may skip forward to the next discussion of the current topic, and then resume sequential playback from that point. During viewing of video content following the topic-focused format or the sequential playback format, when the user selects (e.g., taps or clicks on) button 72, the current playback of meeting content may switch to playback that follows the attendee that is actively speaking at the time of button-selection. Similarly, during viewing of video content following the topic-focused or attendee-focused format, when the user selects (e.g., taps or clicks on) button 74, the current playback of meeting content may switch to playback that follows a temporal sequence.

The disclosed system and methods may improve efficiencies and detail associated with logging and reviewing meeting content. For example, manual notetaking may no longer be required and, thus, the errors and deficiencies normally associated with manual notetaking may be avoided. And because of the multi-faceted recording of video and audio during the meeting, more aspects and perspectives of the meeting may be preserved. In addition, the ability to capture the reviewers' post-meeting reactions and comments, in direct connection with the content being reviewed, may improve clarity and facilitate greater sharing of the content. This may allow for more content from the meeting to be consumed at a higher level.

The user experience during subsequent review of the content may also be improved. For example, the meeting content may be matched to preferences of the reviewing user. This may allow for different perspectives to be absorbed in different ways by different users. This may also allow for quick and concise reviews of only particular meeting details, or longer and more-thorough review of more complex concepts.

Another aspect of the disclosure is directed to a non-transitory computer-readable medium that stores instructions, which, when executed, cause one or more of the disclosed processors (e.g., processor 24) to perform the methods discussed above. The computer-readable medium may include volatile or non-volatile, magnetic, semiconductor, tape, optical, removable, non-removable, or other types of computer-readable medium or computer-readable storage devices. For example, the computer-readable medium may be memory 26 and the computer instructions stored thereon may include programs 28 (e.g., meeting logging and reviewing app 52, operating system 54, etc.) and/or data 30.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for logging and reviewing a meeting, comprising:
   a communication interface configured to receive video of the meeting captured by at least one camera device and audio of the meeting captured by at least one microphone device;
   a memory having computer-executable instructions stored thereon; and
   a processor in communication with the communication interface and the memory, the processor being configured to execute the computer-executable instructions to:
      generate a plurality of data streams based on the captured video and the captured audio;
      determine identifications of attendees of the meeting based on at least one of the captured video and the captured audio;
      transcribe speeches of the attendees based on at least one of the captured audio;
      match the identifications and transcripts to the plurality of data streams; and
      cause a data stream of the plurality of data streams to be shown on a display based on a user-selected identification of an attendee of the meeting,
   wherein the at least one camera device includes an array of cameras configured to capture a plurality of views of the meeting,
   wherein the processor is further configured to execute the computer-executable instructions to:
   detect and track a position of an attendee of the meeting;
   crop the plurality of views of the meeting based on the tracked position of the attendee of the meeting; and
   generate an attendee position stream for the attendee of the meeting based on the cropped views.

2. The system of claim 1, wherein:
   the at least one microphone device includes an array of microphones; and
   the processor is further configured to execute the computer-executable instructions to:
      determine an angle of incoming audio from each of the attendees of the meeting based on audio feed from the array of microphones; and
      generate a voice stream for each attendee of the meeting based at least in part on the angle of incoming audio and known positions of the respective attendees.

3. The system of claim 2, wherein the processor is further configured to execute the computer-executable instructions to link the voice stream for an attendee to the identification of the attendee based on a comparison of characteristics of the voice stream and characteristics of the attendee.

4. The system of claim 3, wherein the processor is further configured to execute the computer-executable instructions to generate a transcript stream corresponding to the voice stream of each attendee.

5. The system of claim 3, wherein the processor is further configured to execute the computer-executable instructions to generate at least one of an index of key words and a topic list based on at least one of the voice stream and the transcript stream of all attendees of the meeting.

6. The system of claim 5, wherein the processor is further configured to execute the computer-executable instructions to:
   receive a search parameter including at least one of a key word and a topic; and
   selectively cause the data stream of the plurality of data streams to be shown on the display based on a comparison of the search parameter with the index of key words and the topic list.

7. The system of claim 1, wherein the processor is further configured to execute the computer-executable instructions to:
   detect and track a position of a display used during the meeting;

crop the plurality of views of the meeting based on the tracked position of the display; and generate a display position stream based on the cropped views.

8. The system of claim 1, wherein the communication interface is further configured to receive at least one user review input captured during showing of the data stream of the plurality of data streams on the display.

9. The system of claim 8, wherein the processor is further configured to execute the computer-executable instructions to:

generate an amendment data stream based on the captured at least one user review input; and temporally link the amendment data stream to the data stream of the plurality of data streams being shown on the display.

10. The system of claim 9, wherein the processor is further configured to execute the computer-executable instructions to cause an indication to be shown on the display when the amendment data stream is available for viewing in connection with the data stream of the plurality of data streams being shown on the display.

11. The system of claim 10, wherein the processor is further configured to execute the computer-executable instructions to:

receive a selection of the indication by the user; and responsively cause the amendment data stream to be shown on the display.

12. The system of claim 1, wherein the processor is further configured to execute the computer-executable instructions to wrap the plurality of data streams together with the captured video and the captured audio into a common file.

13. A method of logging and reviewing a meeting, comprising:

receiving, by a communication interface, video of the meeting captured by at least one camera device and audio of the meeting captured by at least one microphone device;

generating, by a processor, a plurality of data streams based on the video and the audio;

determining, by the processor, identifications of attendees of the meeting based on at least one of the captured video and the captured audio;

transcribing, by the processor, speeches of the attendees based on at least one of the captured audio;

matching, by the processor, the identifications and transcripts to the plurality of data streams; and causing a data stream of the plurality of data streams to be shown on a display based on a user-selected identification of an attendee of the meeting, wherein:

the video includes a plurality of views of the meeting captured by an array of cameras; and the method further includes:

detecting and tracking a position of a display used during the meeting;

making a first cropping of the plurality of views of the meeting based on the tracked position of the display;

generating a display position stream based on the first cropping;

detecting and tracking a position of an attendee of the meeting;

making a second cropping of the plurality of views of the meeting based on the tracked position of the attendee of the meeting; and generating an attendee position stream for the attendee of the meeting based on the second cropping.

14. The method of claim 13, wherein:

the audio is simultaneously captured from a plurality of different locations; and the method further includes:

determining an angle of incoming audio from each of the attendees of the meeting based on audio feed from the from the plurality of different locations;

generating a voice stream for each attendee of the meeting based at least in part on the angle of incoming audio and known positions of the respective attendees; and linking the voice stream for each attendee to the identification of the attendee based on a comparison of characteristics of the voice stream and known characteristics of each attendee.

15. The method of claim 14, further including:

generating a transcript stream corresponding to the voice stream of each attendee;

generating at least one of an index of key words and a topic list based on at least one of the voice stream and the transcript stream of all attendees of the meeting; and receiving a search parameter including at least one of a key word and a topic, wherein selectively displaying the data stream of the plurality of data streams includes selectively displaying the data stream based on a comparison of the search parameter with the index of key words and the topic list.

16. The method of claim 13, further including:

receiving at least one user review input captured during displaying of the data stream of the plurality of data streams;

generating an amendment data stream based on the at least one user review input; and temporally linking the amendment data stream to the data stream of the plurality of data streams being displayed.

17. A non-transitory computer-readable medium storing instructions that are executable by at least one processor to cause performance of a method for logging and reviewing a meeting, the method comprising:

receiving video of the meeting captured by at least one camera device and audio of the meeting captured by at least one microphone device generating a plurality of data streams based on the captured video and the captured audio;

determining identifications of attendees of the meeting based on at least one of the captured video and the captured audio;

transcribing speeches of the attendees based on at least one of the captured audio;

matching the identifications and transcripts to the plurality of data streams; and causing a data stream of the plurality of data streams to be shown on the display based on a user-selected identification of an attendee of the meeting, wherein the video includes a plurality of views of the meeting captured by an array of cameras, and wherein the method further includes:

detecting and tracking a position of an attendee of the meeting;

making a second cropping of the plurality of views of the meeting based on the tracked position of the attendee of the meeting; and generating an attendee position stream for the attendee of the meeting based on the second cropping.

\* \* \* \* \*